United States Patent
Söderkvist et al.

(10) Patent No.: US 6,516,199 B1
(45) Date of Patent: Feb. 4, 2003

(54) REDUCING INTERFERENCE IN TELECOMMUNICATIONS SYSTEMS

(75) Inventors: Jan Erik Söderkvist, Enebyberg (SE); Lars Peter Wahlström, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/996,478

(22) Filed: Dec. 22, 1997

(30) Foreign Application Priority Data

Dec. 23, 1996 (GB) ................................ 9626680

(51) Int. Cl.⁷ .................................. H04B 7/01
(52) U.S. Cl. ................ 455/502; 455/509; 455/524; 370/513; 370/514; 370/509
(58) Field of Search ............... 455/524, 525, 455/560, 561, 502, 503; 370/310, 321, 324, 350, 507, 508, 509, 510, 511, 512, 513, 514

(56) References Cited

U.S. PATENT DOCUMENTS

| | | | |
|---|---|---|---|
| 4,112,498 A | * 9/1978 | Reiner et al. | 364/728 |
| 4,353,130 A | * 10/1982 | Carasso et al. | 375/114 |
| 4,525,840 A | * 7/1985 | Heinz et al. | 371/47 |
| 4,742,514 A | * 5/1988 | Goode et al. | 370/109 |
| 4,754,450 A | * 6/1988 | Lynk, Jr. et al. | 370/29 |
| 5,199,031 A | * 3/1993 | Dahlin | 370/110.1 |
| 5,208,812 A | * 5/1993 | Dudek et al. | 370/100.1 |
| 5,257,399 A | * 10/1993 | Kallin et al. | 455/67.1 |
| 5,258,980 A | * 11/1993 | Maebara et al. | 370/95.1 |
| 5,329,558 A | * 7/1994 | Larsson et al. | 375/114 |
| 5,343,498 A | 8/1994 | Toy et al. | 375/37 |
| 5,430,731 A | * 7/1995 | Umemoto et al. | 370/95.1 |
| 5,613,211 A | * 3/1997 | Matsuno | 455/67.6 |
| 5,684,794 A | * 11/1997 | Lopez et al. | 370/337 |
| 5,793,772 A | * 8/1998 | Burk et al. | 370/508 |
| 6,023,477 A | * 2/2000 | Dent | 370/509 |

FOREIGN PATENT DOCUMENTS

| | | | |
|---|---|---|---|
| EP | 257110 | 3/1988 | |
| EP | 444485 | * 9/1991 | H04B/7/26 |
| EP | 485351 | * 5/1992 | H04B/7/26 |
| FR | 2724509 | 3/1996 | |
| GB | 2320650 | * 5/1992 | H04Q/7/30 |
| WO | WO94/10768 | 5/1994 | |
| WO | WO96/22651 | 7/1996 | |

OTHER PUBLICATIONS

International Search Report re PCT/EP97/07126 Date of mailing of International Search Report: May 15, 1998.
British Search Report Under Section 17 re GB 9626680.4 Date of Search: Mar. 14, 1997.

* cited by examiner

*Primary Examiner*—Edward F. Urban
*Assistant Examiner*—Tilahan Gesesse

(57) ABSTRACT

A cellular network is controlled such that time slots of transmissions from base stations with the same operating frequency are synchronized. Moreover, adjacent base stations using the same frequency are controlled such that, at any given time, they are transmitting different sync words.

15 Claims, 2 Drawing Sheets

REDUCING INTERFERENCE IN TELECOMMUNICATIONS SYSTEMS

TECHNICAL FIELD OF THE INVENTION

The present invention relates to a method of synchronising a radio transmitter with other receivers in a network, in order to minimise the effect of interference from other transmitters. In particular, the invention relates to the synchronisation of a network of base stations in a mobile communications system.

DESCRIPTION OF RELATED ART

In a digital cellular radio system which operates in accordance with the TDMA-principle, such as GSM, D-AMPS or PDC, radio messages are transmitted in frames from base stations, each frame including a given number of time slots. Transmissions in the different time slots are generally intended to be received by different mobile radio receivers, and so it is necessary to ensure that the receiver is synchronised with the transmitter. The mobile transceivers are synchronised to their respective base stations by a signal from the base station.

For example, in full-rate D-AMPS, three mobile receivers share the same frequency channel, and therefore each channel is divided into three time slots, each lasting 6.7 ms, three time slots forming a frame. The frames are repeated 50 times per second.

Each time slot in the frame is assigned to a particular mobile receiver, until either the call is released, or the mobile is handed over to another channel, for example in another cell.

In each time slot, 324 bits are transmitted, most of which are data bits, but 28 of which form a synchronisation word.

The standard published by the Electronics Industries Association as EIA/TIA Publication IS136, which specifies the D-AMPS system, defines six different synchronisation words, but only three of those are used for a channel running at full-rate. Thus, a different synchronisation word is allocated to each time slot in a frame, and the base station transmits the relevant synchronisation word once during each time slot. The mobile receiver is able to recognise transmissions intended for it by identifying the synchronisation word, and similarly includes the same synchronisation word in its own transmissions to the base station.

The synchronisation words in IS136 are chosen such that there is minimal correlation between them. Thus, there is only a very small chance that a receiver will mis-identify a transmitted synchronisation word with a different synchronisation word. A danger, however, is that a receiver will receive the expected synchronisation word from an interfering transmitter operating on the same frequency, and will falsely interpret it as its expected synchronisation word. Moreover, there is the possibility that a receiver will falsely interpret data sent by an interfering transmitter on the same frequency as its expected synchronisation word.

Attempts have been made in the prior art to overcome these problems.

One known possibility is simply to allow each base station transceiver to select its own timing, meaning that there is no synchronisation between the base stations. In this situation, it is possible, although rather unlikely, that an interfering transmitter will be transmitting the same synchronisation word with a signal level sufficient to cause interference, and at a point in time sufficiently close to the expected time to give the possibility of false synchronisation.

An alternative known possibility is to synchronise the entire network, such that every base station is transmitting the same synchronisation word at the same time. This increases the probability that it will falsely receive the synchronisation word from an interfering transmitter, and interpret it as its own expected synchronisation word.

The probability of a false identification in this way depends on the carrier/interference (C/I) ratio, which relates to the relative signal levels of the transmissions from a desired transmitter, and from an interfering transmitter operating on the same frequency. Because there are only a limited number of frequencies available for use in a system, it is necessary to re-use the frequencies. Frequency planning can maximise the frequency re-use distance, and hence maximise the C/I ratio, but in general cannot guarantee that the C/I ratio will be high enough to avoid any possibility of interference by falsely detecting the synchronisation word from an interfering transmitter.

It is an object of the invention to increase the probability of correct synchronisation, by planning the use of the synchronisation words.

SUMMARY OF THE INVENTION

A network in accordance with the invention comprises a number of base stations, some of which use the same frequency. In accordance with the invention, the base stations are synchronised, so that their time slots coincide, and the network is planned such that the neighbouring base stations operating on the same frequency transmit different synchronisation words during any given time slot.

The invention also relates to the method of coordination of the air frame positions of the base stations, and to the base stations themselves.

The advantage of the invention is that the risk of false synchronisation can be minimised, even under less favourable C/I conditions.

DETAILED DESCRIPTION OF PREFERRED EMBODIMENTS

Figure 1:
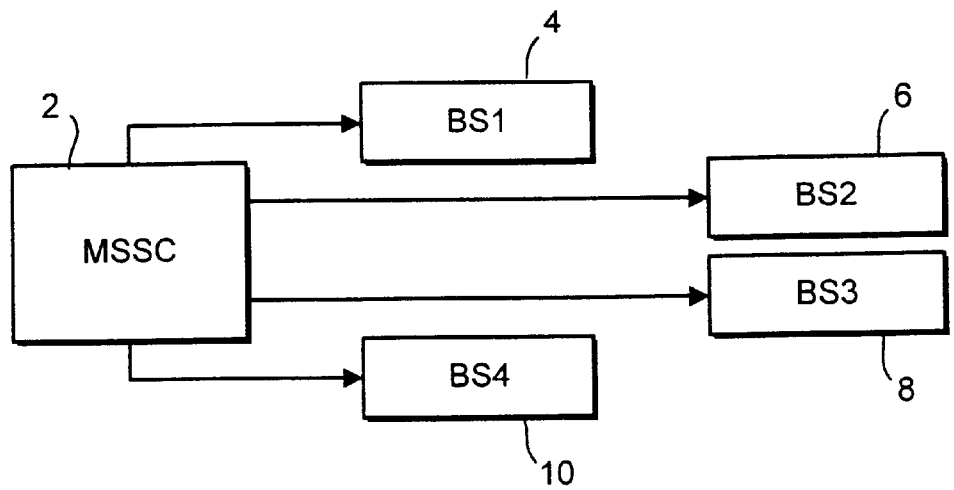
FIG. 1 is a block schematic diagram of a telecommunications network in accordance with the invention.

FIG. 1 represents a cellular communications network, having a Mobile Services Switching Centre (MSSC) 2, which is in communication with, and controls, base stations 4, 6, 8, 10 (referred to herein as BS1, BS2, BS3 and BS4 respectively). It will be appreciated that the network includes many more such base stations, and only four base stations are shown here for clarity of explanation.

Figure 2:
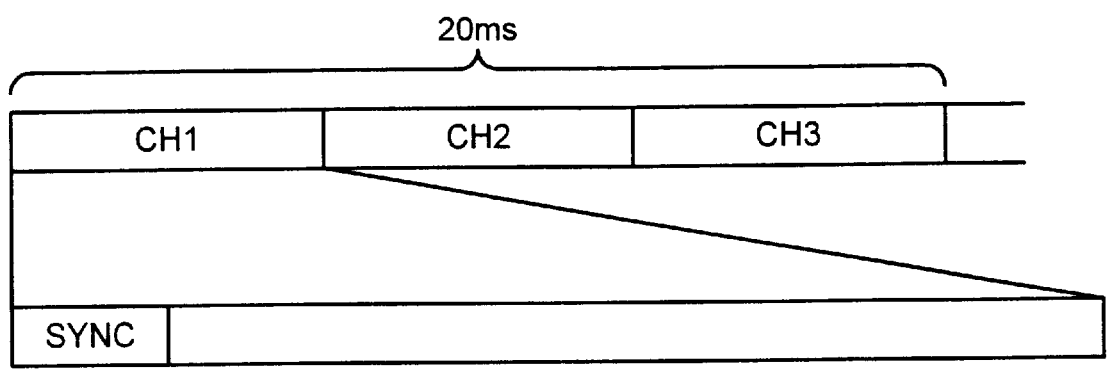
FIG. 2 represents transmissions by a base station on a particular operating frequency.

FIG. 2 represents transmissions by the first base station BS1. In each frame, lasting 20 ms, there are three time slots, each allocated to a different mobile receiver. Communications to a first mobile receiver on channel CH1 take place in the first time slot, communications to a second mobile receiver on channel CH2 take place in the second time slot, and communications to a third mobile receiver on a third channel CH3 take place in a third time slot. Each time slot consists of 324 bits, 28 of which form a synchronisation word SYNC. Each time slot contains a different synchronisation word (or sync word), to allow the mobile receivers to identify the transmissions which they are intended to receive.

Similarly, transmissions from the mobile receivers to the base stations also contain the sync words.

Because of the limited availability of frequencies, each frequency must be re-used by a number of base stations within the network. Thus, in FIG. 1, base stations BS1, BS2, BS3 and BS4 all operate on the same frequency.

Figure 3:
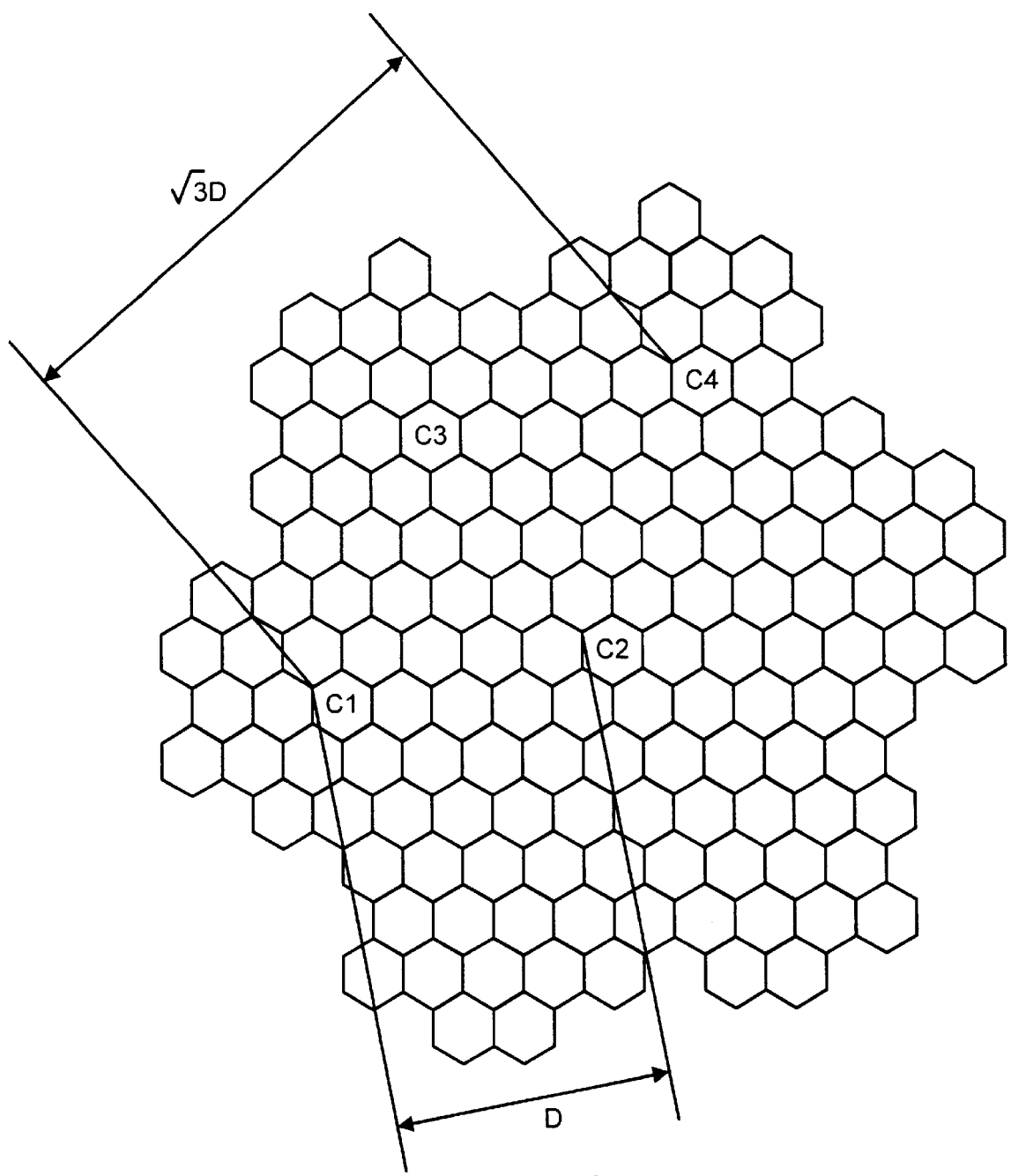
FIG. 3 represents the coverage of an area by a cellular communications network.

FIG. 3 shows a part of an area covered by a mobile telecommunications network. The area can be considered as being covered by a large number of generally hexagonal cells, each of which contains a base station. (It will be well known to the person skilled in the art that, instead, base stations may be located at cell boundaries, radiating different operating frequencies into the different adjacent cells). FIG. 3 shows the cells C1, C2, C3 and C4, in which base stations BS1, BS2, BS3 and BS4 respectively are located. To reduce the possibility of interference between base stations transmitting on the same frequency, the network is planned so that base stations which use the same frequency are as widely separated as possible. In this case, cells C1 and C2 are separated by the minimum frequency re-use distance D.

Thus, a mobile receiver in cell C1 will be attempting to detect transmissions from base station BS1, on the particular operating frequency of that base station, containing a particular synchronisation word. However, there is a danger that, instead, the receiver will detect the signal transmitted by base station BS2 in cell C2, or from base station BS3 in cell C3 (or indeed from any other base station using the same operating frequency). The likelihood of this depends on the ambient reception conditions, but also depends crucially on the frequency re-use distance D.

In this context, the other base stations, transmitting signals which can interfere with the desired transmission on the intended frequency are known as cochannel interferers. In the event that the mobile receiver falsely interprets data from a cochannel interferer as the desired sync word, the receiver may lose the required timing, or may incorrectly initiate its demodulator, resulting in a deterioration in performance of the demodulator.

In accordance with the invention, the MSSC 2 transmits control signals to all of the base stations, causing them to transmit their time slots simultaneously, or at least within a couple of symbols of one another. That is, the base stations share the same "air frame clock". Thus, each base station is transmitting a sync word at more or less the same time as every other base station, or at least every other base station operating on the same frequency. It should be noted that control signals from a central unit to the base stations may also be transmitted via satellite, if preferred. Also, GPS clock signals may be used by the base stations, in which case the base stations will need to be provided with suitable receivers for detecting signals from GPS satellites.

In the embodiment described so far, the network uses three different synchronisation words, each associated with a respective one of the time slots. The MSSC 2 controls the base stations such that, as far as is possible, adjacent cochannel interferers are not transmitting the same sync word at the same time as each other. Thus, in the network shown in FIG. 3, base station BS1 in cell C1 might at one particular instant be transmitting a first sync word, to be followed in the next two time slots by a second sync word and a third sync word. Base station BS2 in cell C2 might at the same instant be transmitting the second sync word, to be followed in the next two time slots by the third sync word and the first sync word. Base station BS3 in cell C3 might at the same instant be transmitting the third sync word, to be followed in the next two time slots by the first sync word and the second sync word. Then, base station BS4 in cell C4 might, like base station BS1, be transmitting the first sync word, to be followed in the next two time slots by the second sync word and the third sync word. This means that a mobile receiver in cell C1, attempting to detect the transmission from the base station BS1, will now be highly unlikely to make a false detection by receiving transmissions from cells C2 or C3, because of the very low correlation between the three sync words. The nearest cell from which it is likely to receive a sync signal which it falsely detects as the sync signal from base station BS1 is base station BS4 in cell C4. As indicated in FIG. 3, cell C4 is √3D from cell C1. This distance can be considered to be a minimum time position re-use distance, by analogy with the minimum frequency re-use distance D. Thus, the probability of a false synchronisation caused by a mobile receiver detecting the intended synchronisation word from a cochannel interferer is greatly reduced. This means that, when planning the network, it is possible either to use a shorter frequency re-use distance, or to operate in worse C/I conditions.

What is claimed is:

1. A method of controlling a cellular communications network, comprising at least a first base station and a second base station, each operating on a first frequency, with no other base stations operating on the first frequency located between the first base station and the second base station, the method comprising:

dividing transmission from each base station into a plurality of time slots, transmitting to each base station a clock signal, such that the time slots in transmissions from the base stations are transmitted substantially simultaneously allocating a sequence of sync words for transmission from the first base station and allocating the same sequence of sync words for transmission from the second base station, and controlling the transmissions from the first and second base stations such that the first and second base stations transmit different sync words in each time slot.

2. A method as claimed in claim 1, wherein transmission from each base station are divided into three time slots, and wherein the sequence of sync words comprises three sync words.

3. A method as claimed in claim 1, wherein the network further comprises a plurality of base stations operating on a second frequency.

4. A method as claimed in claim 3, further comprising transmitting the clock signal to each base station in said plurality of base stations, such that transmissions from all of the base stations are synchronized.

5. A method as claimed in claim 1, wherein the clock signal is a GPS clock signal transmitted from a GPS satellite.

6. A cellular communications network, comprising a controller and at least a first base station and second base station, each operating on a first frequency, with no other base stations operating on the first frequency located between the first base station and the second base station, wherein:

each base station divides its transmissions into a plurality of time slots, wherein the controller transmits to each base station a clock signal, such that the time slots in transmissions from the base stations are transmitted substantially simultaneously, wherein a sequence of sync words is allocated for transmissions from the first base station and the same sequence of sync words is allocated for transmissions from the second base station, and wherein the controller controls the transmissions from the first and second base stations such that the first and second base stations transmit different sync words in each time slot.

7. A network as claimed in claim 6, wherein each base station divides its transmissions into three time slots, and the sequence of sync words comprises three sync words.

8. A network as claimed in claim 6, further comprising a plurality of base stations operating on a second frequency.

9. A network as claimed in claim 8, wherein the controller transmits the clock signal the first and second base station and to each base station in said plurality of base stations, such that transmissions from all of the base stations are synchronized.

10. A TDMA cellular telephone system, comprising a plurality of base station transceivers, each base station periodically transmitting a sync word chosen from a set of available sync words so that all sync words are transmitted by a base station in a sequence, and each base station operating on a frequency chosen from a set of available frequencies, wherein the base stations share the same air frame clock, the set of available frequencies are allocated to the base stations to maximise the frequency re-use distance, and base stations operating on the same frequency transmit the sync words in respective sequences which maximise the time position re-use distance.

11. A TDMA cellular telephone system, comprising a plurality of base station transceivers, each base station operating on a respective frequency chosen from a set of available frequencies, and transmitting in frames, with each frame being divided into time slots, the base stations sharing a common air frame clock such that the time slots of the base stations are synchronized, each base station transmitting in each time slot a sync word chosen from a set of available sync words so that all sync words are transmitted by a base station in a cycle which is common to all base stations, wherein the base stations are controlled such that, to the greatest extent possible, each base station transmits the sync words in a cycle which is out of phase with the adjacent base stations operating on the same frequency.

12. A method of controlling a TDMA cellular telephone system comprising a plurality of base station transceivers, each base station operating on a respective frequency chosen from a set of available frequencies, and transmitting in frames, with each frame being divided into time slots, the base stations sharing a common air frame clock such that the time slots of the base stations are synchronized, each base station transmitting in each time slot a sync word chosen from a set of available sync words so that all sync words are transmitted by a base station in a cycle which is common to all base stations, the method comprising controlling the base stations such that, to the greatest extent possible, each base station transmits the sync words in a cycle which is out of phase with the nearest base stations operating on the same frequency.

13. A controller for a TDMA cellular telephone system comprising a plurality of base station transceivers, each base station operating on a respective frequency chosen from a set of available frequencies, and transmitting in frames, with each frame being divided into time slots, each base station transmitting in each time slot a sync word chosen from a set of available sync words so that all sync words are transmitted by a base station in a cycle which is common to all base stations, wherein the controller comprises means for transmitting to the base stations a common air frame clock such that the time slots of the base stations are synchronized, and wherein the controller comprises means for transmitting to the base stations control signals such that, to the greatest extent possible, each base station transmits the sync words in a cycle which is out of phase with the nearest base stations operating on the same frequency.

14. A base station for a TDMA cellular telephone system comprising a plurality of base station transceivers, wherein:

the base station operates on a respective frequency chosen from a set of available frequencies, and transmitting in frames, with each frame being divided into time slots, the base station transmits in each time slot a sync word chosen from a set of available sync words so that all sync words are transmitted by a base station in a cycle which is common to all base stations, the base station comprises means for detecting and operating with a common air frame clock such that the time slots of the base stations are synchronized, and the base station receives control signals which determine the phase position of the cycle in which the sync words are transmitted.

15. The base station of claim 14, wherein said cycle is out of phase with sync word transmission cycles of at least one other base station transmitting on said respective frequency.

* * * * *